United States Patent
Saitoh

(10) Patent No.: US 9,636,840 B2
(45) Date of Patent: May 2, 2017

(54) CHAIN SAW

(71) Applicant: HITACHI KOKI CO., LTD., Tokyo (JP)

(72) Inventor: Hiroyuki Saitoh, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 24 days.

(21) Appl. No.: 14/382,262

(22) PCT Filed: Mar. 6, 2013

(86) PCT No.: PCT/JP2013/001394
§ 371 (c)(1),
(2) Date: Aug. 29, 2014

(87) PCT Pub. No.: WO2013/136724
PCT Pub. Date: Sep. 19, 2013

(65) Prior Publication Data
US 2015/0038275 A1 Feb. 5, 2015

(30) Foreign Application Priority Data

Mar. 14, 2012 (JP) ................ 2012-056763

(51) Int. Cl.
*B27B 17/02* (2006.01)
*B27B 17/08* (2006.01)
(Continued)

(52) U.S. Cl.
CPC ............. *B27B 17/08* (2013.01); *B27B 17/02* (2013.01); *B27B 17/14* (2013.01); *F16H 7/06* (2013.01); *F16H 7/14* (2013.01)

(58) Field of Classification Search
CPC ....... B27B 17/02; B27B 17/025; B27B 17/04; B27B 17/06; B27B 17/08; B27B 17/083;
(Continued)

(56) References Cited

U.S. PATENT DOCUMENTS 1,825,164 A * 9/1931 Skillman ................. B27B 17/06
83/797
3,669,162 A * 6/1972 Irgens ..................... B27B 17/08
30/371
(Continued)

FOREIGN PATENT DOCUMENTS

JP 07-127476 A 5/1995
JP 2003-251602 A 9/2003
(Continued)

OTHER PUBLICATIONS

International Search Report issued in International Application No. PCT/JP2013/001394 with Date of mailing May 28, 2013, with English Translation.
(Continued)

*Primary Examiner* — Laura M Lee
(74) *Attorney, Agent, or Firm* — McDermott Will & Emery LLP

(57) ABSTRACT

A chain saw is provided with an adjustment mechanism that adjusts the tension of a saw chain 4 attached along a guide bar 3 projecting from a main body 2. The adjustment mechanism has a rotation shaft 55 that is provided with a feed screw, a moving element 70 that is moved on the rotation shaft 55 in an axial direction along with rotation of the rotation shaft 55 and moves the guide bar 3 forward/backward with respect to the main body 2, and a transmission mechanism including an internal gear 51 provided on an inner peripheral surface of an adjustment dial 50 rotatably provided on the main body 2 and an external gear 52 disposed on an inner side of the adjustment dial 50 and engaged with the internal gear 51. When the internal gear 51 is rotated along with rotation of the adjustment dial 50, the rotation shaft 55 is rotated via the external gear 52.

6 Claims, 4 Drawing Sheets

(51) Int. Cl.
*B27B 17/14* (2006.01)
*F16H 7/06* (2006.01)
*F16H 7/14* (2006.01)

(58) Field of Classification Search
CPC ......... B27B 17/086; B27B 17/14; F16H 7/06; F16H 7/14
USPC .................................................. 30/381–387
See application file for complete search history.

(56) References Cited

U.S. PATENT DOCUMENTS

| | | | | |
|---|---|---|---|---|
| 3,844,380 | A * | 10/1974 | Batson | F16N 13/06 184/15.1 |
| 3,857,179 | A * | 12/1974 | Haupt | B27B 17/08 30/381 |
| 4,919,001 | A * | 4/1990 | Ogiwara | G02B 21/26 359/391 |
| 5,699,619 | A * | 12/1997 | Sundstrom | B27B 17/08 30/383 |
| 6,532,671 | B1 * | 3/2003 | Jong | B27B 17/14 30/386 |
| 7,322,114 | B2 * | 1/2008 | Kawamura | B27B 17/14 30/383 |
| 7,343,841 | B2 * | 3/2008 | Phillips | B23D 59/003 403/259 |
| 7,434,502 | B2 * | 10/2008 | Keeton | B27B 17/14 30/386 |
| 7,676,934 | B2 * | 3/2010 | Liao | B27B 17/14 30/383 |
| 8,485,937 | B2 * | 7/2013 | Zhou | B27B 5/32 475/337 |
| 2006/0000098 | A1 | 1/2006 | Kawamura | |
| 2007/0062361 | A1 | 3/2007 | Xiong et al. | |
| 2008/0141544 | A1 | 6/2008 | Liao | |
| 2009/0241353 | A1 * | 10/2009 | Ericson | B27B 17/14 30/386 |
| 2011/0162757 | A1 * | 7/2011 | Sommerville | B27C 5/02 144/253.1 |

FOREIGN PATENT DOCUMENTS

| | | |
|---|---|---|
| JP | 2006-015606 A | 1/2006 |
| WO | 2004/078435 A1 | 9/2004 |

OTHER PUBLICATIONS

Notification of Reasons for Refusal Japanese Patent Application No. 2012-056763 dated Nov. 4, 2015 with full English translation.

* cited by examiner

CHAIN SAW

TECHNICAL FIELD

The present invention relates to a chain saw, and particularly relates to a chain saw capable of adjusting the tension of a saw chain.

BACKGROUND ART

Chain saws used for cutting of timbers and others have a main body, a guide bar extending from the main body, and a saw chain provided over the main body and the guide bar. A rear end side of the saw chain is wound around a sprocket provided in the main body, and when the sprocket is driven to rotate, the saw chain turns along an outer peripheral part of the guide bar.

Some of the chains saws described above are provided with an adjustment mechanism for adjusting the tension of the saw chain. Patent Literature 1 describes an adjustment mechanism including: a moving member which is coupled to a chain guiding plate corresponding to the above-described guide bar and is moved along a threaded rod member by rotation of the threaded rod member; a driven gear integrated with the threaded rod member; a driving gear provided in an operation part rotated by an operator; and an intermediate gear disposed between the driving gear and the driven gear for transmitting the rotation of the driving gear to the driven gear. In this adjustment mechanism, when the operation part is rotated by the operator, the rotation is transmitted to the threaded rod member via the driving gear, the intermediate gear, and the driven gear, and the threaded rod member is rotated.

CITATION LIST

Patent Literature

PTL 1: Japanese Patent Application Laid-Open Publication No. 2006-15606

SUMMARY OF INVENTION

Technical Problem

The driving gear, the intermediate gear, and the driven gear constituting the adjustment mechanism described in Patent Literature 1 are all external gears and are disposed along a side case. More specifically, the driving gear, the intermediate gear, and the driven gar are disposed on the same plane. Therefore, the side case has to be expanded in order to ensure a space for disposing the driving gear, the intermediate gear, and the driven gear, which causes the increase in size of the chain saw.

An object of the present invention is to downsize a chain saw provided with an adjustment mechanism for adjusting the tension of a saw chain.

Solution to Problem

In an aspect of the present invention, a chain saw having an adjustment mechanism that adjusts tension of a saw chain attached along a guide bar projecting from a main body is provided. The adjustment mechanism includes: a rotation shaft provided with a feed screw; a moving element that is moved on the rotation shaft in an axial direction along with rotation of the rotation shaft and moves the guide bar forward/backward with respect to the main body; and a transmission mechanism including a first gear that is provided on an inner peripheral surface of a first rotation member rotatably provided on the main body and a second gear that is disposed on an inner side of the first rotation member and is engaged with the first gear, and when the first gear is rotated along with rotation of the first rotation member, the rotation shaft is rotated via the second gear.

In another aspect, the number of teeth of the first gear is larger than the number of teeth of the second gear.

In another aspect, a rotation axis of the first gear and the second gear and a rotation axis of the rotation shaft are orthogonal to each other.

In another aspect, a third gear that is integrally rotated with the second gear and a fourth gear that is integrally rotated with the rotation shaft and is engaged with the third gear are provided, and the first gear and the second gear are spur gears, and the third gear and the fourth gear are bevel gears.

In another aspect, a second rotation member that shares a rotation axis with the first rotation member and a screw member that is projecting from the main body to penetrate through the guide bar and is provided with a male screw coupled to a female screw provided on the second rotation member are provided, and the guide bar is sandwiched between the main body and the second rotation member.

In another aspect, a fixation member that is disposed around the screw member and between the guide bar and the second rotation member is provided, and the guide bar is sandwiched between the main body and the second rotation member via the fixation member.

In another aspect, the first rotation member has a circular-disk-like base part, a first sidewall part extending from a periphery of the base part toward the main body, and a second sidewall part extending from the periphery of the base part toward a direction opposite to the first sidewall part, the first gear is formed on an inner peripheral surface of the first sidewall part of the first rotation member, and the second rotation member is disposed on the base part of the first rotation member and on an inner side of the second sidewall part.

Advantageous Effects of Invention

According to the present invention, downsizing of a chain saw provided with an adjustment mechanism for adjusting the tension of a saw chain is realized.

DESCRIPTION OF EMBODIMENTS

Figure 1:
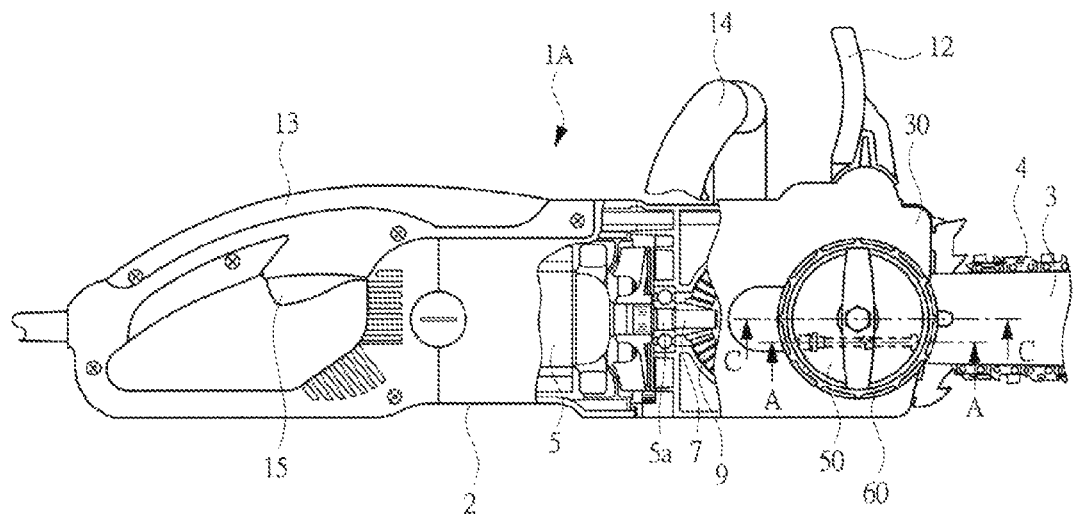
FIG. 1 is a side view of a chain saw to which the present invention is applied.
Figure 2:
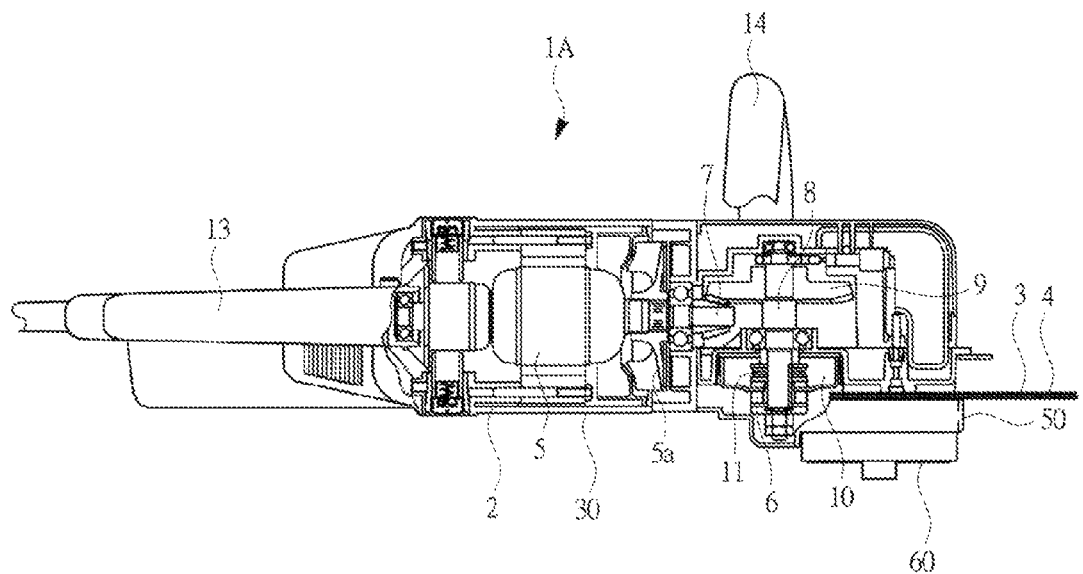
FIG. 2 is a cross-sectional view of the chain saw shown in FIG. 1.

Hereinafter, a first embodiment of a chain saw of the present invention will be described in detail with reference to drawings. As shown in FIG. 1 and FIG. 2, a chain saw 1A according to the present embodiment has a main body 2, a guide bar 3 projecting from the main body 2, and a saw chain 4 wound around the guide bar 3. The main body 2 is provided with an electric motor 5 serving as a drive source and a sprocket 6 (FIG. 2) driven to rotate by the electric motor 5.

A pinion gear 7 is provided at a distal end part of a rotation shaft 5a of the electric motor 5. The pinion gear 7 is engaged with a gear 9, which is provided at one end of a spindle 8 (FIG. 2) disposed in a direction orthogonal to the rotation shaft 5a. As shown in FIG. 2, the other end of the spindle 8 is coupled to a clutch housing 10, and the sprocket 6 is provided at an end face of the clutch housing 10. Therefore, when the electric motor 5 is driven, the spindle 8 rotates, and when the spindle 8 rotates, the sprocket 6 rotates together with the clutch housing 10. As a matter of course, the spindle 8 and the clutch housing 10 are coupled by a clutch mechanism provided in the clutch housing 10 so as to be switchable between an engaged state in which the rotation of the spindle 8 is transmitted to the clutch housing 10 and an unengaged state in which the rotation of the spindle 8 is not transmitted to the clutch housing 10. Specifically, the spindle 8 is penetrating through a plurality of spring washers 11 disposed in the clutch housing 10, and the spindle 8 and the clutch housing 10 are coupled by the elastic force of the spring washers 11. Furthermore, a brake band (not shown) is wound around an outer peripheral surface of the clutch housing 10. When a hand guard 12 swingably supported by the main body 2 is pushed down to the front side with respect to the main body 2, the brake band works. Specifically, the brake band is tightened, and the coupling of the spindle 8 and the clutch housing 10 is released (switched to the unengaged state) against the elastic force of the spring washers 11. Then, the rotation of the clutch housing 10 is instantly stopped, and only the spindle 8 keeps rotating (the spindle 8 idles). In the present embodiment, the plurality of spring washers 11 constituting the above-described clutch mechanism are disposed in the clutch housing 10, and therefore, dead space in the clutch housing 10 is efficiently utilized. In other words, since it is not necessary to ensure the space for disposing the spring washers 11 on the outside of the clutch housing 10, the main body 2 can be made compact.

The guide bar 3 and the sprocket 6 are disposed on approximately the same plane, and part (rear end part) of the saw chain 4 wound around the guide bar 3 is wound around the sprocket 6. More specifically, the saw chain 4 is wound over the sprocket 6 and the guide bar 3, and when the sprocket 6 rotates in the above-described manner, the saw chain 4 turns along an outer peripheral part of the guide bar 3. An operator can cut or grind an object such as a timber by pushing the turning saw chain 4 against the object. On the other hand, when the brake band is tightened during the turning of the saw chain 4, the rotation of the sprocket 6 is instantly stopped, and the turning of the saw chain 4 is also instantly stopped.

The main body 2 is provided with a main handle 13 and a front handle 14 on the rear side and the front side. The main handle is provided with a trigger switch 15 for increasing/decreasing the number of rotations of the electric motor 5. When the trigger switch 15 is operated by the operator, the number of rotations of the electric motor 5 is increased/decreased depending on the degree of the operation, and the turning speed of the saw chain 4 is changed along with that.

The guide bar 3 is attached to a lateral surface of the main body 2 and is moved forward/backward with respect to the main body 2 by an adjustment mechanism. Herein, "the guide bar 3 is moved forward/backward with respect to the main body 2" means that the guide bar 3 is moved forward and moved backward with respect to the main body 2. Furthermore, "the guide bar 3 is moved forward with respect to the main body 2" means that the guide bar 3 gets away from the sprocket 6 shown in FIG. 2. On the other hand, "the guide bar 3 is moved backward with respect to the main body 2" means that the guide bar 3 approaches the sprocket 6. When the guide bar 3 moves forward with respect to the main body 2, the distance between the guide bar 3 and the sprocket 6 is increased, and the tensile force that acts on the saw chain 4 wound over both of them is increased. On the other hand, when the guide bar 3 is moved backward with respect to the main body 2, the distance between the guide bar 3 and the sprocket 6 is reduced, and the tensile force that acts on the saw chain 4 wound over both of them is reduced. More specifically, the tension of the saw chain 4 can be adjusted by moving the guide bar 3 forward/backward with respect to the main body 2 by the adjustment mechanism.

Figure 3:
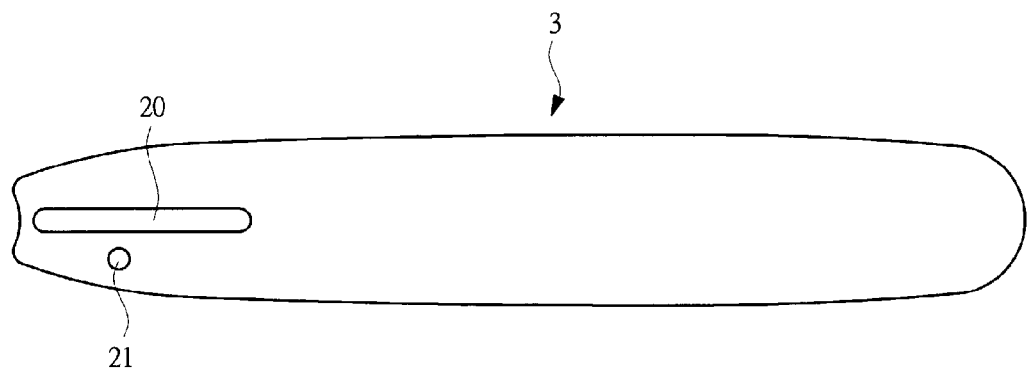
FIG. 3 is an enlarged view of a guide bar.

As shown in FIG. 3, a long hole 20 extending along the longitudinal direction of the guide bar 3 is formed at one end (rear end) of the guide bar 3, and a round hole 21 is formed in the vicinity of the long hole 20. The rear end of the guide bar 3 at which the long hole 20 and the round hole 21 are formed is attached to the lateral surface of the main body 2 covered with a side cover 30 (FIG. 1, FIG. 2).

Hereinafter, an attachment structure of the guide bar 3 to the main body 2 will be described in detail. In the description below, a fixing mechanism will be mainly described first, and the adjustment mechanism will be then mainly described.

Figure 4:
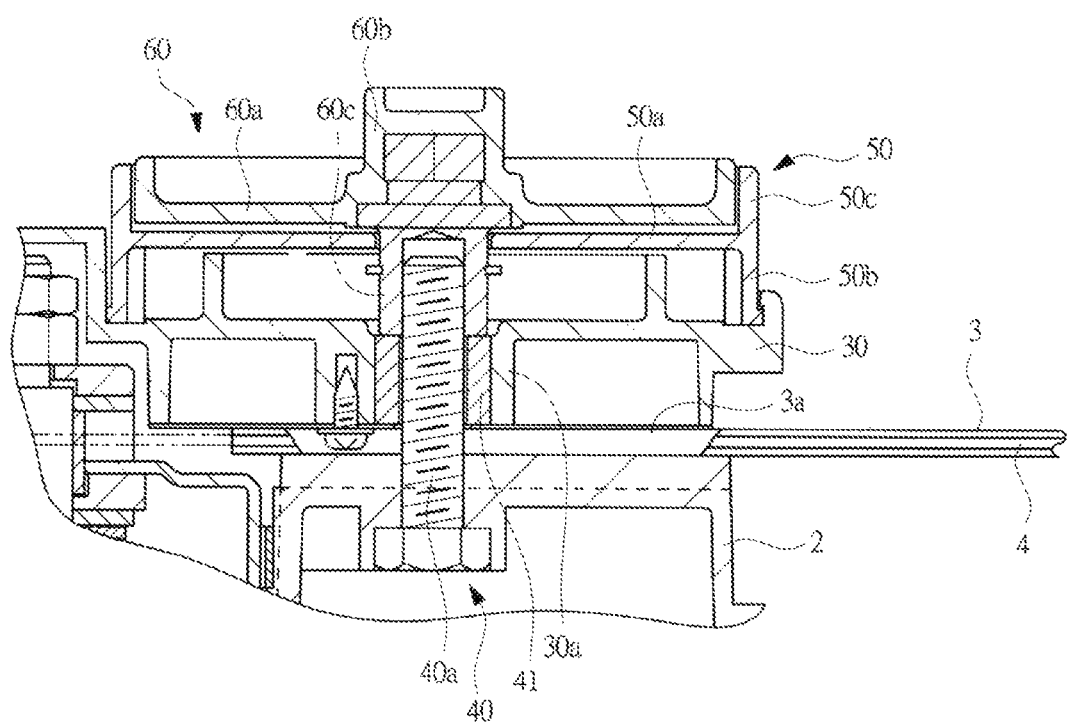
FIG. 4 is a C-C cross-sectional view of FIG. 1.

As shown in FIG. 4, a bolt 40 serving as a screw member is inserted in the main body 2. A shaft part 40a of the bolt 40 is projecting from the lateral surface of the main body 2 and penetrating through the long hole 20 (FIG. 3) of the guide bar 3. As a result, the guide bar 3 is retained on the lateral surface of the main body 2 so as to be able to be moved forward/backward with respect to the main body 2. Specifically, the guide bar 3 can reciprocate in the longitudinal direction thereof, but cannot move in the direction intersecting with the longitudinal direction.

The shaft part 40a of the bolt 40 penetrating through the long hole 20 of the guide bar 3 is penetrating through a cylindrical collar 41 fitted into a cylindrical boss part 30a formed on the back side of the side cover 30, and is projecting to the front side of the side cover 30.

A first rotation member (adjustment dial 50) which rotates with using a distal end part of the shaft part 40a as a rotation axis is disposed on the front side of the side cover 30. A second rotation member (fixation dial 60) which rotates with using the distal end part of the shaft part 40a as a rotation axis is overlapped and disposed on the adjustment dial 50.

The adjustment dial 50 has a circular-disk-like base part 50a, a first sidewall part (inner-side sidewall part 50b) extending from the periphery of the base part 50a toward the side cover 30, and a second sidewall part (outer-side sidewall part 50c) extending from the periphery of the base part 50a toward the direction opposite to the inner-side sidewall part 50b. The base part 50a, the inner-side sidewall part 50b, and the outer-side sidewall part 50c are integrally formed from synthetic resin.

The fixation dial 60 has a circular-disk-like base part 60a having a diameter smaller than that of the base part 50a of the adjustment dial 50, a knob part 60b provided to project on the front side of the base part 60a, and a cylindrical boss part 60c provided to project on the back side of the base part 60a. The base part 60a, the knob part 60b, and the boss part 60c are integrally formed from synthetic resin.

The fixation dial 60 is disposed above the base part 50a of the adjustment dial 50 and inside the outer-side sidewall part 50c. The boss part 60c provided on the back side of the fixation dial 60 to project therefrom is penetrating through a through hole formed in the base part 50a of the adjustment dial 50. A nut is inserted in the boss part 60c and a male screw formed on the shaft part 40a of the bolt 40 is coupled to a female screw formed on the nut. Therefore, when the fixation dial 60 is rotated to tighten the coupling of the female screw and the male screw, the collar 41 is pushed against the guide bar 3 (or a metal plate 3a covering a rear end part of the guide bar 3) by the fixation dial 60 (the boss part 60c). More specifically, the guide bar 3 is sandwiched and fixed between the fixation dial 60 and the lateral surface of the main body 2 via the collar 41. On the other hand, when the coupling of the female screw and the male screw is loosened by rotating the fixation dial 60 in the reverse direction, the fixation of the guide bar 3 is released. When the fixation of the guide bar 3 is released, the guide bar 3 can be moved forward/backward with respect to the main body 2 along the sliding guide of the inner peripheral surface of the long hole 20 (FIG. 3) and the outer peripheral surface of the shaft part 40a of the bolt 40. Alternatively, a guide pin parallel to the shaft part 40a of the bolt 40 may be provided so that the guide bar 3 is moved forward/backward along the sliding guide of the inner peripheral surface of the long hole 20 (FIG. 3) and the outer peripheral surfaces of the shaft part 40a of the bolt 40 and the guide pin. The collar 41 may be omitted by extending the boss part 60c of the fixation dial 60.

Figure 5:
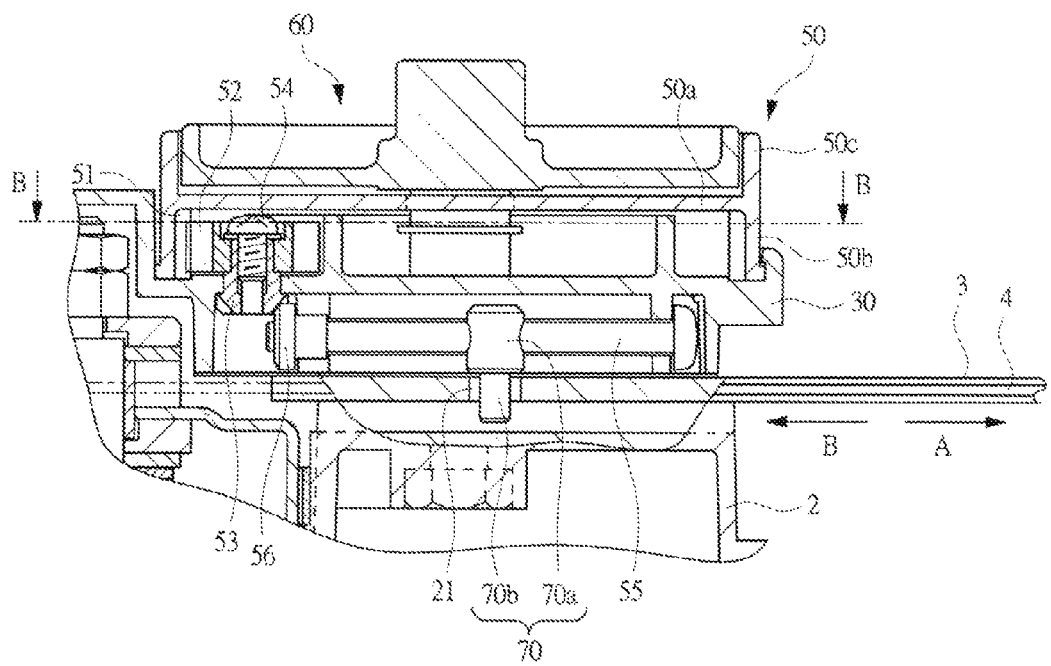
FIG. 5 is an A-A cross-sectional view of FIG. 1.
Figure 6:
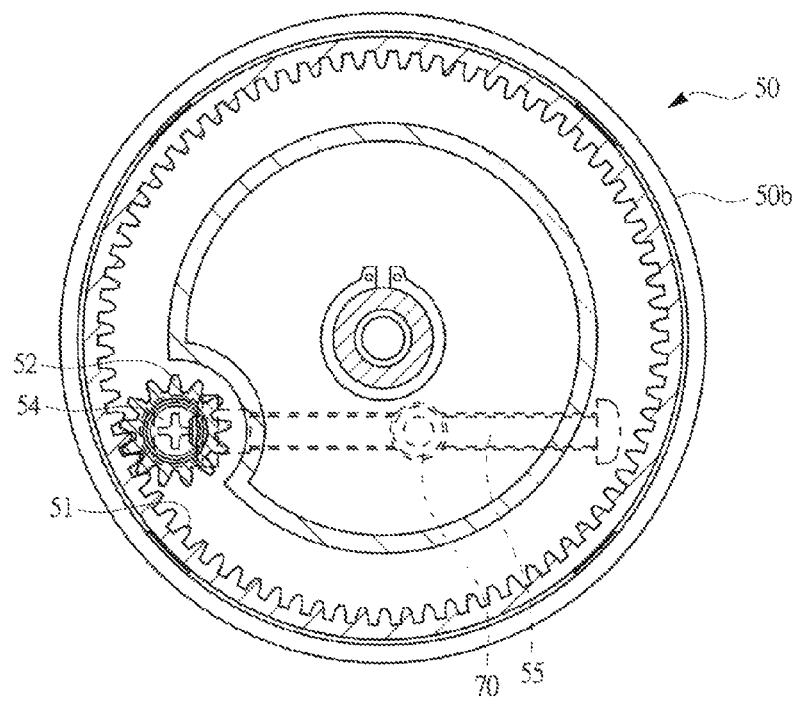
FIG. 6 is a B-B cross-sectional view of FIG. 5.

Next, the adjustment mechanism will be described. As shown in FIG. 5 and FIG. 6, on the inner peripheral surface of the inner-side sidewall part 50b of the adjustment dial 50, a spur gear (internal gear 51) serving as a first gear is formed on the entire circumference thereof. A spur gear (external gear 52) serving as a second gear is provided on the front side of the side cover 30. A bevel gear (driving-side bevel gear 53) serving as a third gear is provided on the back side of the side cover 30. The external gear 52 and the driving-side bevel gear 53 are mutually fixed and integrated by a screw 54. A rotation shaft 55 having a feed screw formed on an outer peripheral surface thereof is rotatably retained on the back side of the side cover 30. A bevel gear (driven-side bevel gear 56) serving as a fourth gear engaged with the driving-side bevel gear 53 is provided at one end of the rotation shaft 55. In addition, a female screw part 70a of a moving element 70 is coupled to the feed screw of the rotation shaft 55, and a latch pin 70b inserted in the round hole 21 of the guide bar 3 is projecting from the female screw part 70a.

Figure 7:
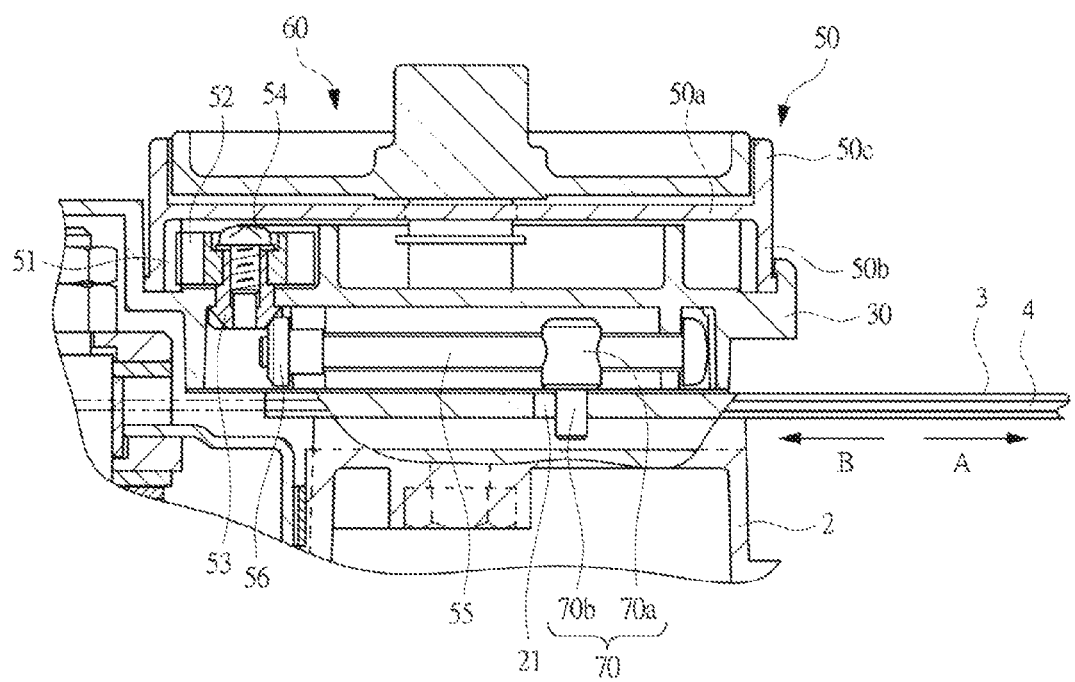
FIG. 7 is an A-A cross-sectional view of FIG. 1 showing a case when a moving element is at a position different from the position shown in FIG. 5.

In the structure configured in the above-described manner, when the adjustment dial 50 is rotated clockwise, the rotation is transmitted to the rotation shaft 55 via the internal gear 51, the external gear 52, the driving-side bevel gear 53, and the driven-side bevel gear 56, and the rotation shaft 55 is rotated. A reverse screw is formed on the rotation shaft 55, and when the rotation shaft 55 is rotated, the moving element 70 coupled to the feed screw is moved in the direction of an arrow A in FIG. 5. Then, as shown in FIG. 7, the guide bar 3 is pushed by the moving element 70 moving in the direction of the arrow A and is moved in the same direction (moved forward with respect to the main body 2). On the other hand, when the adjustment dial is rotated counterclockwise, the rotation shaft 55 is rotated in the direction reverse to that of the above-described case, and the moving element 70 coupled to the feed screw is moved in the direction of an arrow B in FIG. 5. Then, the guide bar 3 is pushed by the moving element 70 moving in the direction of the arrow B and is also moved in the same direction (moved backward with respect to the main body 2).

As described above, a transmission mechanism which transmits the rotation of the adjustment dial 50 to the rotation shaft 55 is constituted of the internal gear 51, the external gear 52, the driving-side bevel gear 53, and the driven-side bevel gear 56. In other words, the transmission mechanism has a two-level gear structure provided with a first-level gear including the internal gear 51 and the external gear 52 and a second-level gear including the driving-side bevel gear 53 and the driven-side bevel gear 56.

In the present embodiment, the rotation direction of the first-level gear is converted by 90 degrees by the second-level gear and transmitted to the rotation shaft 55. Therefore, the adjustment dial 50 can be disposed in the plane parallel to a principal surface of the guide bar 3. As a result, the area occupied by the tension adjustment mechanism in the lateral surface of the chain saw 1A can be suppressed, and the main body 2 is downsized. Also, since the external gear 52 and the internal gear 51 are overlapped with each other in the axial direction, the projecting amount thereof in the axial direction is suppressed. Moreover, since the external gear 52 and the internal gear 51 are overlapped with each other also on the lateral surface of the chain saw 1A, the rotation shaft 55 and the adjustment dial 50 can be made close to each other. Therefore, the main body 2 can be further downsized by coaxially providing the fixation dial 60 and the adjustment dial 50 on the side cover 30. In addition, since the transmission mechanism is made up of the internal gear 51 and the external gear 52, the influence exerted by the adjustment of a gear ratio on the positional relation between the transmission mechanism and the rotation shaft 55 is small. Therefore, the gear ratio with the internal gear 51 can be set to be high without drastically changing the outer diameter of the external gear 52. As a result, the working amount of the rotation shaft 55 can be increased with a small operation of the adjustment dial 50, and the adjustment mechanism with good workability can be constituted. Furthermore, the outer diameter of an operation part of the adjustment dial 50 can be increased by increasing the outer diameter of the internal gear 51 enclosing the external gear 52. When the outer diameter of the operation part is increased, the operator can generate large torque with small power in the tension adjusting operation and the fixation of the side cover 30 by the fixation dial 60. That is, operability is improved.

In the present embodiment, the number of teeth of the internal gear 51 is larger than the number of teeth of the external gear 52, and the numbers of teeth of the driving-side bevel gear 53 and the driven-side bevel gear 56 are equal to each other. More specifically, the gear ratio of the first-level gear is larger than 1, and the gear ratio of the second-level gear is 1. Therefore, since the rotation speed of the adjustment dial 50 is increased by the first-level gear, the guide bar 3 can be moved forward/backward with a small rotation amount. As a matter of course, the gear ratio of the second-level gear can be increased to more than 1 so as to achieve the further increase in the speed.

In the present embodiment, the internal gear 51 is integrally formed on the inner peripheral surface of the adjustment dial 50, but an internal gear 51 which is separated from the adjustment dial 50 may be fixed to and integrated with the inner peripheral surface of the adjustment dial 50. Also, in the present embodiment, the external gear 52 and the driven-side bevel gear 53, which are separated from each other, are mutually fixed and integrated by the screw 54, but the external gear 52 and the driven-side bevel gear 53 can be integrally formed. Moreover, in the present embodiment, the electric motor is used as a drive source, but an internal combustion engine or a pneumatic motor can be used as a drive source. Furthermore, the adjustment dial can be configured so that the guide bar is moved backward when the adjustment dial is rotated clockwise and the guide bar is moved forward when the adjustment dial is rotated counterclockwise.

The invention claimed is:

1. A chain saw comprising an adjustment mechanism that adjusts tension of a saw chain attached along a guide bar projecting from a main body,
wherein the adjustment mechanism includes:
a moving element that moves the guide bar forward/backward with respect to the main body; and
a transmission mechanism including:
a first gear that is provided on an inner peripheral surface of a first rotation member rotatably provided on the main body;
a second gear that is disposed on an inner side in a radial direction of the first rotation member and is engaged with and enclosed in the first gear;
a rotation shaft;
a third gear that is integrally rotated with the second gear; and
a fourth gear that is integrally rotated with the rotation shaft and is engaged with the third gear,
wherein when the first gear is rotated along with rotation of the first rotation member, the moving element is moved via the second gear,
wherein the moving element is moved on the rotation shaft in an axial direction along with rotation of the rotation shaft,
wherein the first gear and the second gear are spur gears, and the third gear and the fourth gear are bevel gears,
wherein the first gear and the second gear are disposed at positions overlapped with the first rotation member with respect to an axial direction of a rotation shaft of the first rotation member, and
wherein the third gear, the fourth gear, and the rotation shaft are disposed at positions not overlapped with the first rotation member with respect to an axial direction of the rotation shaft of the first rotation member.

2. The chain saw according to claim 1,
wherein the number of teeth of the first gear is greater than the number of teeth of the second gear.

3. The chain saw according to claim 2,
wherein a rotation axis of the first gear and the second gear and a rotation axis of the rotation shaft are orthogonal to each other.

4. The chain saw according to claim 1, further comprising:
a second rotation member that shares a rotation axis with the first rotation member; and
a screw member that is projecting from the main body to penetrate through the guide bar and is provided with a male screw coupled to a female screw provided on the second rotation member,
wherein the guide bar is positioned between the main body and the second rotation member.

5. The chain saw according to claim 4, further comprising:
a fixation member that is disposed around the screw member and between the guide bar and the second rotation member,
wherein the guide bar is sandwiched between the main body and the second rotation member via the fixation member.

6. The chain saw according to claim 4,
wherein the first rotation member has a discoid base part, a first sidewall part extending from a periphery of the base part toward the main body, and a second sidewall part extending from the periphery of the base part toward a direction opposite to the first sidewall part,
the first gear is formed on an inner peripheral surface of the first sidewall part of the first rotation member, and
the second rotation member is disposed on the base part of the first rotation member and on an inner side of the second sidewall part.

* * * * *